(No Model.) 3 Sheets—Sheet 1.

G. W. BUSHONG.
COMBINED ROTARY CULTIVATOR AND STALK CUTTER.

No. 537,966. Patented Apr. 23, 1895.

Witnesses
F. M. Johnson
D. P. Wolhaupter

Inventor
George W. Bushong
By his Attorneys.
C. A. Snow & Co.

THE NORRIS PETERS CO., PHOTO-LITHO., WASHINGTON, D. C.

(No Model.) 3 Sheets—Sheet 2.

G. W. BUSHONG.
COMBINED ROTARY CULTIVATOR AND STALK CUTTER.

No. 537,966. Patented Apr. 23, 1895.

Witnesses
F. M. Johnson
D. P. Wolhaupter(?)

Inventor
George W. Bushong
By his Attorneys,
C. A. Snow & Co.

(No Model.)
3 Sheets—Sheet 3.

G. W. BUSHONG.
COMBINED ROTARY CULTIVATOR AND STALK CUTTER.

No. 537,966.  Patented Apr. 23, 1895.

Witnesses

Inventor
George W. Bushong
By his Attorneys,
C. A. Snow & Co.

UNITED STATES PATENT OFFICE.

GEORGE W. BUSHONG, OF KIRK, NEBRASKA, ASSIGNOR OF ONE-HALF TO HENRY HOFFMAN, OF SAME PLACE.

COMBINED ROTARY CULTIVATOR AND STALK-CUTTER.

SPECIFICATION forming part of Letters Patent No. 537,966, dated April 23, 1895.

Application filed August 31, 1894. Serial No. 521,853. (No model.)

*To all whom it may concern:*

Be it known that I, GEORGE W. BUSHONG, a citizen of the United States, residing at Kirk, in the county of Banner and State of Nebraska, have invented a new and useful Combined Rotary Cultivator and Stalk-Cutter, of which the following is a specification.

This invention relates to combined rotary cultivators and stalk cutters adapted to operate upon one or two rows at one time, and also capable of being used either for cultivating rows of corn, or as a cutter for chopping down the stalks.

To this end the main and primary object of the present invention is to provide a new and useful machine of the character noted having a variety of different adjustments whereby the work required thereof may be properly accomplished.

With these and other objects in view, which will readily appear as the nature of the invention is better understood, the same consists in the novel construction, combination, and arrangement of parts hereinafter more fully described, illustrated, and claimed.

Figure 1:
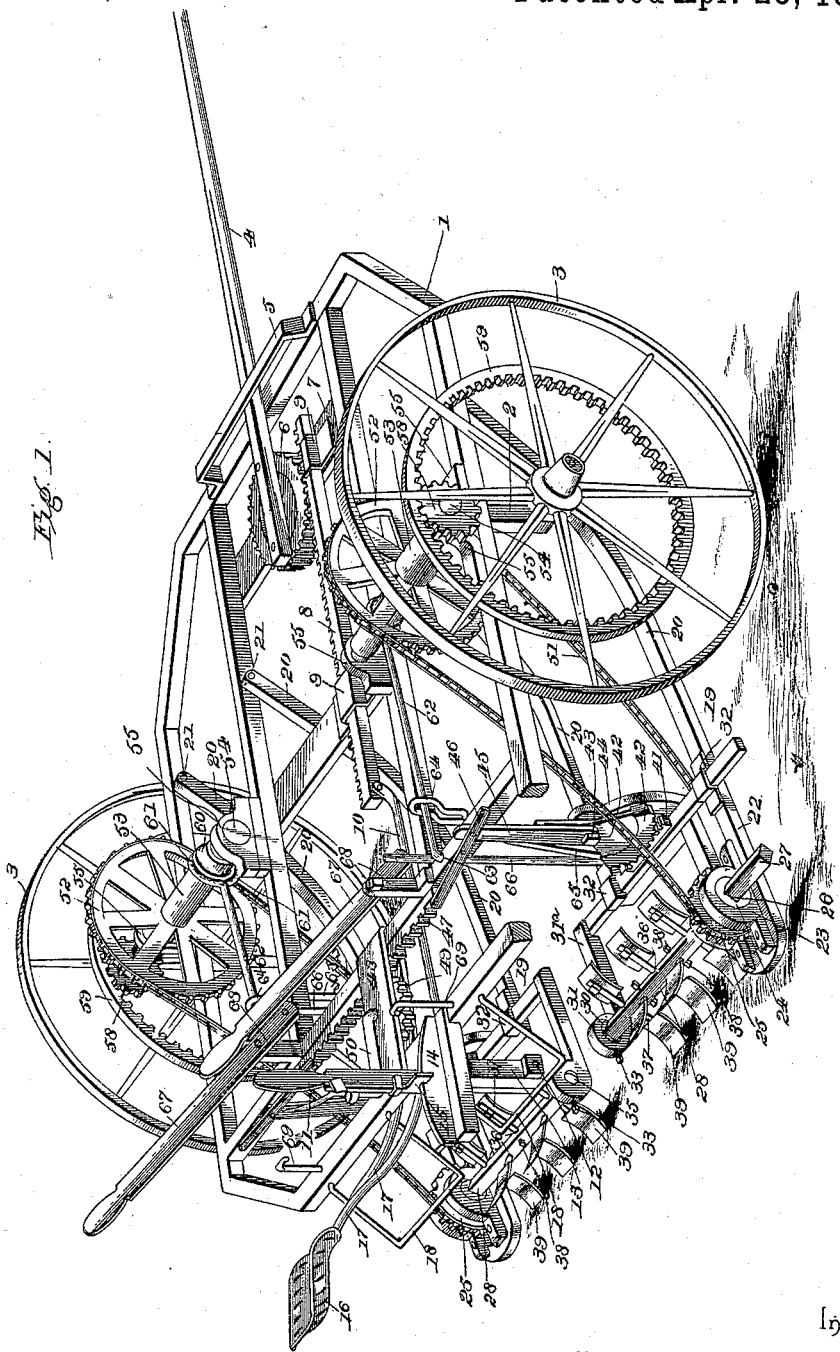
Figure 2:
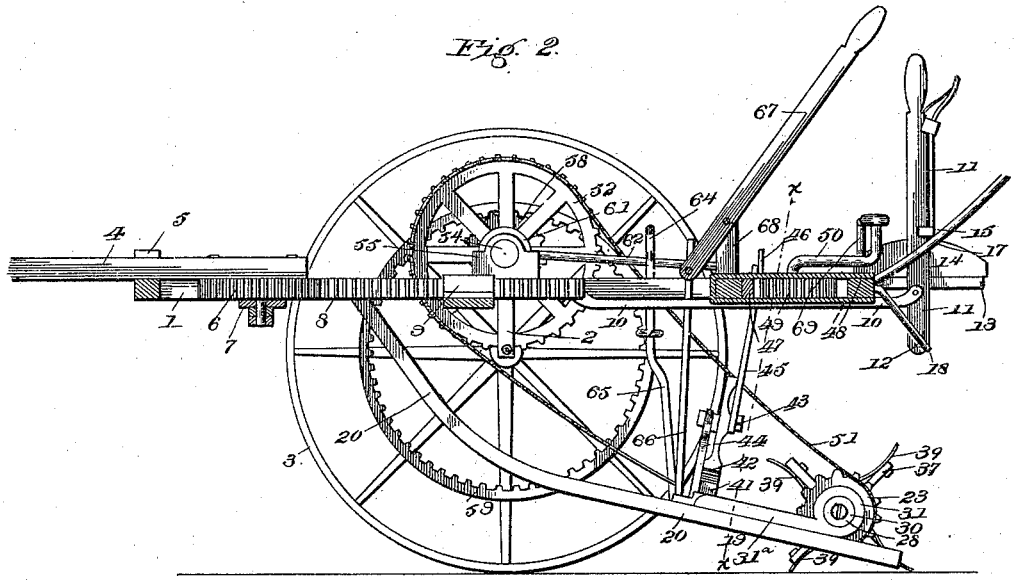
Figure 3:
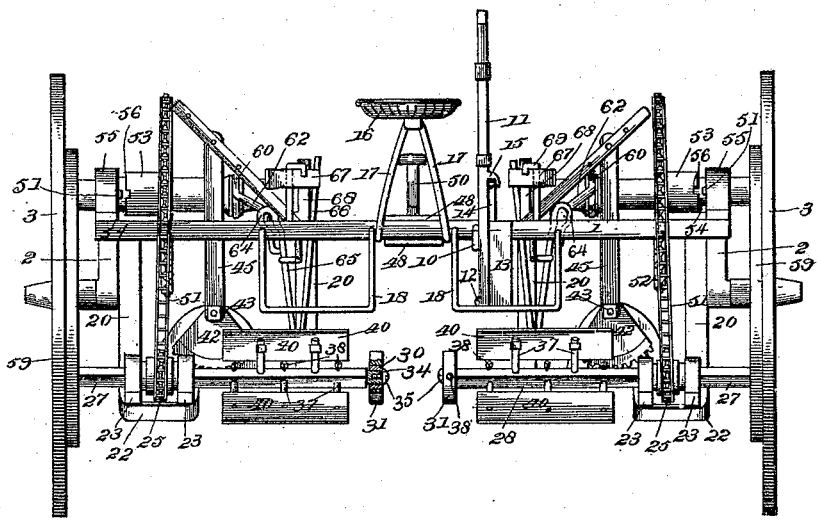
Figure 4:
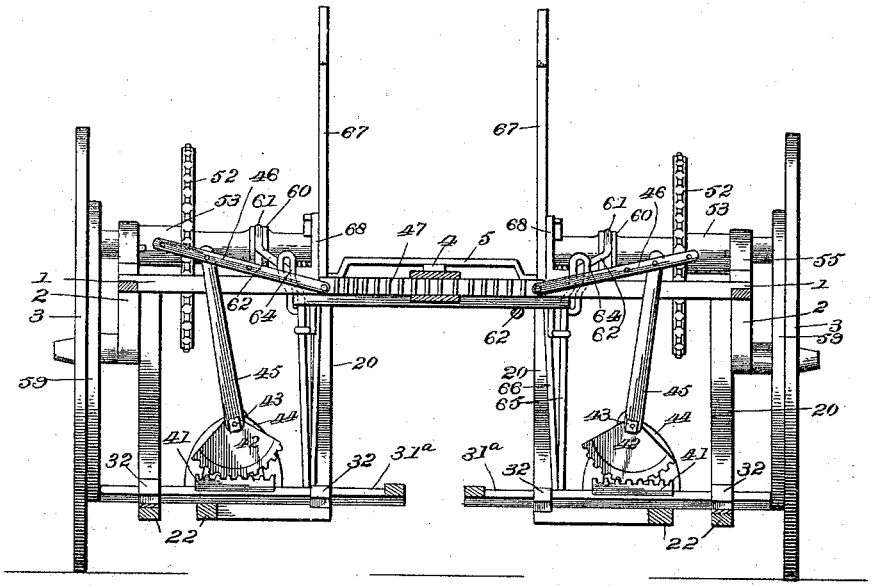
Figure 5:
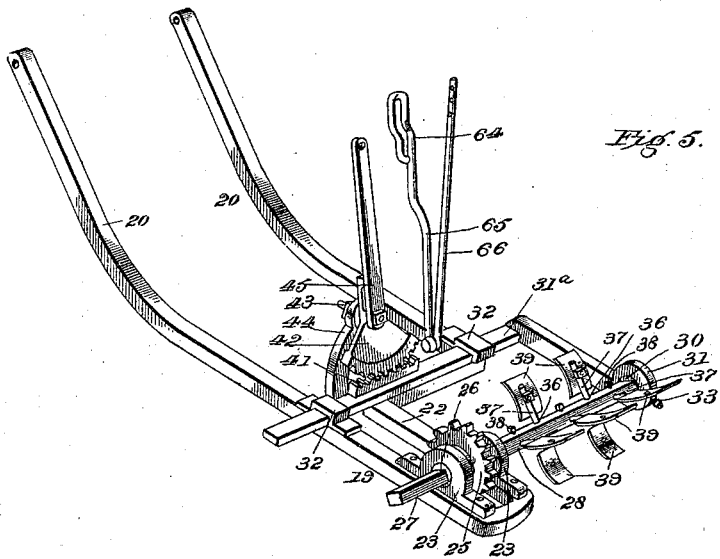

In the accompanying drawings:—Figure 1 is a perspective view of a machine constructed in accordance with this invention. Fig. 2 is a central vertical longitudinal sectional view thereof. Fig. 3 is a rear or end elevation of the machine. Fig. 4 is a transverse sectional view on the line $x$—$x$ of Fig. 2. Fig. 5 is a detail in perspective of one of the pivoted drag frames and the laterally adjustable bearing frame and rotary shovel carrying shaft mounted thereon.

Referring to the accompanying drawings, 1 designates a substantially rectangular machine frame to opposite sides of which are secured the offstanding wheel spindles 2, on which are mounted the ordinary ground wheels 3, that support the frame for travel on the ground and at the same time provide for transmitting motion to the working parts of the machine.

The wheeled machine frame 1, is drawn by a team in the ordinary manner connected to the draft tongue or pole 4, and in the present invention the draft tongue or pole 4, has a swinging movement and is guided near its inner end in this movement in the transversely arranged guide loop 5, secured to the upper side of the frame 1, at its front end, and in rear of the loop 5, the inner end of the tongue is suitably secured to the upper side of a horizontal gear wheel 6, that is pivotally mounted on top of a supporting cross bar 7, that is secured to the frame 1, near its front end. The teeth of the gear wheel 6, mesh with an adjacent sliding rack bar 8, which is mounted to slide in the guide loops 9 supported in longitudinal alignment on the frame 1, and the rear end of said rack bar has connected thereto one end of the connecting rod 10, the other end of which is pivotally connected to the adjusting lever 11, arranged at the rear end of the frame 1. The adjusting lever 11, is pivotally secured at its lower end as at 12, to an offstanding bracket 13, secured to the rear end of the machine frame, and the said lever works at one side of the notched segment plate 14, on the upper side of said bracket, and the notch of which is adapted to be engaged by the latch 15, mounted on the lever 11, and suitably operated by hand in the usual manner. The lever 11, is located adjacent to the driver's seat 16, supported on the outer end of the seat arms 17, that are secured to and extend beyond the rear end of the frame 1, and at both sides of the seat arms 17, and secured to the rear end of the machine frame are the offstanding U-shaped foot stirrups 18, to support the feet of the driver. By manipulating the lever 11, the driver can, through the medium of the connections described, shift the position of the draft tongue or pole and thereby easily guide the machine wherever desired.

Pivotally suspended from the wheeled frame 1, at both sides of the center thereof are the pivoted independently adjustable dragframes 19. The independently adjustable drag-frames 19, are provided with the curved parallel frame arms 20, that are pivotally secured at their upper front ends on the pivot bolts 21 to longitudinal frame-bars of the frame 1 in front of the transverse center of the frame. The lower rear ends of the framearms 20, of the frames 19, are extended into a U-shaped arm-extension 22, that is projected from substantially the rear ends of the frames 19 at one side of the longitudinal center of such frames, so as to be disposed substantially in alignment with the outer arm of the frames, and said arm extensions 22 of the independently adjustable drag frames 19, have mounted thereon a pair of spaced bearing boxes 23, in which are journaled the opposite hub extremities 24, of the chain or sprocket wheels 25, mounted to rotate between the said bearing boxes near the outer rear ends of the arm extensions 22. The sprocket wheels 25, that are mounted on the said drag frames 19, in the manner described, are provided with the squared hub openings 26 that loosely receive the squared shaft ends 27, of the rotary shovel carrying shatfs 28, the other inner ends of which are provided with the rounded bearing spindles 29, that turn in the removable bushing rings 30, that are fitted in the bearing collars 31, formed at the outer ends of one of the arms of the L-shaped laterally adjustable bearing frames 31ª, the other transversely disposed arms of which are mounted to slide on the rear ends of the frames 19, in the aligned guide loops 32, that are secured on the said frames 19, in front of the arm extensions 22, thereof.

The bushing rings 30 that are fitted in the bearing-collars 31, are removably or replaceably held in position by means of the set screws 33, mounted in the said bearing collars, and the inner ends of the shafts 28, that are journaled in said bushings, are provided with the threaded openings 34, to receive the retaining screws 35, working outside of the collars 31, and serving to secure the shovel carrying shafts thereto, so that the said shafts will be adjusted with the frames 31ª, when such frames are adjusted. The said shovel carrying shafts 28, are provided with a series of openings 36, therethrough to adjustably receive the shovel arms 37, that extend to both sides of the shaft, and are adjustably secured in the openings therethrough by means of the set screws 38. The shovel arms 37, extend radially from the shafts to which they are secured and are alternately arranged with respect to each other, and to the opposite extremities of these shovel arms are removably secured either the cultivator shovels 39, or the ordinary cutter shovels 40. The shovels 39, are attached separately to the ends of the shovel arms, as clearly illustrated in the drawings, and provide a construction that adapts the machine for the cultivation of one or two rows of corn at the same time, and the cutter shovels 40 simply consist of long cutter blades that are ordinarily employed in connection with machines for cutting stalks, and when used in connection with the herein described machine are attached to the aligned ends of the arms 37, and the shovels 39 and 40 are readily interchangeable to quickly adapt the machine for cultivating or stalk cutting purposes as will be obvious.

The transversely disposed arms of the L-shaped bearing frames 31ª, are provided on their upper sides with the rack bars 41, with which mesh the teeth of the gear segments 42, pivotally mounted on the pivot bolts 43, at one side of the bracket plates 44, projected upwardly from the rear ends of the said drag frames, and the said gear segments 42, have secured thereto the lower ends of the gear levers 45, to the upper ends of which are pivotally and adjustably connected one end of the adjusting links 46, the other ends of which are pivotally connected to the opposite extremities of the horizontally adjustable rack bar 47, that is supported to slide horizontally through the bearing boxing 48, mounted on the rear end of the wheel frame 1. The horizontally adjustable rack bar 47, meshes with the teeth of an adjusting gear wheel 49, mounted horizontally within the boxing 48 and having connected thereto the operating crank 50, that is disposed in front of the driver's seat 16, so as to be conveniently reached by the driver. By manipulating the operating crank 50 it will be obvious that the opposite L-shaped bearing frames 31ª, will be adjusted simultaneous in the same lateral direction, to the right or left thereby providing means for adjusting the rotary cultivators or cutters to and away from the rows being operated upon without disturbing the positions of the chain or sprocket wheels 25, it being noted that the quared ends 27, of the shaft 28, freely slides in the squared openings 26, of the sprocket wheels during adjustment.

The chain or sprocket wheels 25, are rotated by means of the sprocket chains 51, passing at one end over said chain or sprocket wheels, and at their other ends over the drive sprocket wheels 52, that are arranged on the adjustable sleeves 53. The adjustable sleeves 53, are mounted loosely on the short drive shafts 54, journaled in suitable bearing boxes 55, arranged on the frame 1 at both sides of the center thereof. The sleeves 53, are shorter than the shafts 54, so as to have a longitudinal movement between the bearing boxes 55, and at one end the said sleeves are provided with the notched or clutch collars 56, adapted to engage and disengage the clutch pins 57, fitted in the said drive shaft 54, and the said drive shafts 54, have mounted on their outer ends the pinions 58, that mesh with the internal gear wheels 59, secured to the inner sides of the ground wheels 3, thereby providing connections for the transmission of motion from the ground wheels to the said short drive shafts.

The adjustable shaft sleeves 53, are provided near their inner ends with the grooved collars 60, which are loosely engaged by the yoke ends 61, of the adjusting levers 62, that are pivoted at their other ends as at 63, to the frame 1, in rear of the shafts 54, and said adjusting levers 62, extend through the cam slots 64, at the upper ends of the operating lever rods 65, pivotally connected at their lower ends to the frames 19, and at the point of connection of the lever rods 65, to said drag frames 19, are also connected the lower ends of the lifting arms 66, to the upper ends of which are pivotally and adjustably connected the inner ends of the adjusting levers 67, pivotally supported on the bracket plates 68, and extending to the rear of the machine at both sides of the driver's seat 16, so as to be easily controlled by the driver. The adjusting levers 67, when in their lowered positions are adapted to be locked in engagement with the catch hooks 69, arising from the rear end bar of the frame 1. When the levers 67, are engaged with the catch hooks 69, the lifting arms 66, will be elevated so as to elevate the rear ends of the drag frames, and hold the rotary cultivators or cutters off of the ground. In this adjustment the cam slots 64, at the upper ends of the operating levers 65, will be so disposed as to move the levers 62, in a direction that disengages the clutch collars 56, of the shaft sleeves 53, from the shaft pins 57, so that the ground wheels will not communicate motion to the rotary shovel carrying shafts of the machine. To lower the rotary cultivators or cutters onto the ground, the levers 67, are disengaged from the hooks 69, which allows the drag frames to lower and to become self-adjustable, vertically, and the same movement, through the medium of the levers 65, locks the shaft sleeves to the shafts 54, by means of the clutch connections described, and thereby throws the machine into gear.
From the above it is thought that the construction, operation and many advantages of the herein described combined cultivator and stalk cutter will be readily apparent to those skilled in the art, and it will be understood that changes in the form, proportion and the minor details of construction may be resorted to without departing from the principle or sacrificing any of the advantages of this invention.
Having described the invention, what is claimed, and desired to be secured by Letters Patent, is—

1. In a machine of the class described, the combination with the wheeled frame provided at its front end with a transversely arranged guide loop, a gear wheel pivotally mounted on the front end of the frame in rear of said guide loop, a draft tongue or pole working in said guide loop and attached at its inner end to said wheel, a rack bar mounted to slide longitudinally on said frame and meshing with the teeth of said gear wheel, at one side of the same, an offstanding bracket arranged at the rear end of the machine, an adjusting lever pivotally mounted on said bracket and provided with a catch device, and a connecting rod attached to said lever and to the rear end of said rack bar substantially as set forth.
2. In a machine of the class described, the wheeled frame, independently adjustable drag frames pivotally suspended from said wheeled frame, rotary cultivators or cutters mounted for transverse adjustment on said drag frames, gearing for said cultivators or cutters, and means for automatically throwing the cultivators or cutters in and out of gear by the adjustment of the drag frames, substantially as set forth.

3. In a machine of the class described, the wheeled frame, independently adjustable drag frames pivotally suspended from the wheeled frame, and having guides transversely adjustable bearing frames mounted to slide in the guides of said drag frames, rotary cultivators or cutters carried by said bearing frames, gearing, and adjusting devices to simultaneously control the gearing and adjust said drag frames, substantially as set forth.

4. In a machine of the class described, the wheeled frame, independently adjustable drag frames pivotally suspended from said wheeled frame at both sides of its center, transversely adjustable bearing frames mounted to slide on said drag frames, rotary cultivators or cutters carried by said bearing frames, and means for simultaneously adjusting both of said bearing frames, transversely on said drag frames substantially as set forth.

5. In a machine of the class described, the combination of the wheeled frame, the separate drag frames pivotally suspended from said wheeled frame, transversely adjustable bearing frames mounted to slide on said drag frames and provided on their upper sides with rack bars, rotary cultivators or cutters carried by said bearing frames, gear segments pivotally supported above said bearing frames on said drag frames and meshing with said rack bars of the bearing frames, gear levers connected at their lower ends to said gear segments, a horizontally adjustable rack bar supported for movement at the rear end of the wheeled frame, adjusting links connected to the opposite ends of said horizontally adjustable rack bar and to the upper ends of said gear levers, and a crank operated gear wheel supported on the rear end of the wheeled frame and meshing with said horizontally adjustable rack bar, substantially as set forth.

6. In a machine of the class described, the combination of the wheeled frame, separate curved drag frames pivotally connected at their upper front ends to the wheeled frame and provided at their rear ends with arm extensions disposed at one side of the longitudinal center of the frames, aligned guide loops arranged on the rear ends of said drag frames, a pair of spaced bearing boxes mounted on the arm extensions of said drag frames, L-shaped transversely adjustable bearing frames having the transversely disposed arms thereof sliding in said guide loops and the other arms of said bearing frames being provided at their outer ends with bearing collars, chain or sprocket wheels journaled between and in the said pairs of bearing boxes and provided with squared hub openings, gearing connections between said chain or sprocket wheels and the wheels of the main frame, shovel carrying shafts fixedly journaled at one end in the bearing collars of said L-shaped frames and provided with opposite squared ends loosely fitting in the squared hub openings of the said chain or sprocket wheels, and a series of shovel arms adjustably fitted in openings in said shafts, substantially as set forth.

7. In a machine of the class described, the combination of the machine frame, the ground wheels journaled at opposite sides of said frame and carrying gear wheels, pivoted drag frames suspended from said machine frame and carrying rotary cultivating or cutting devices, chain or sprocket wheels connected with said cultivating or cutting devices, short drive shafts mounted in the machine frame and provided at one end with pinions meshing with said gear wheels and at a point near one end with clutch pins, shaft sleeves loosely mounted on said short drive shafts and provided with drive sprocket wheels, clutch collars at one end to engage and disengage said clutch pin, and with grooved collars near their opposite ends, adjusting levers pivotally connected at one end to the machine frame and loosely at the other ends to the grooved collars of said sleeves, operating lever rods pivotally connected at their lower ends to the drag frames and provided at their upper ends with cam slots working over said adjusting levers, lifting arms pivotally connected to said drag frames, pivotally supported levers connected to said lifting arms, catches for the said latter levers, and chains connecting the sprocket wheels, substantially as set forth.

In testimony that I claim the foregoing as my own I have hereto affixed my signature in the presence of two witnesses.

GEORGE W. BUSHONG.

Witnesses:
H. L. GRAVID,
F. O. BAKER.